United States Patent
Huang et al.

(10) Patent No.: US 7,386,841 B2
(45) Date of Patent: Jun. 10, 2008

(54) TECHNIQUE FOR DETERMINING A TARGET DATA TYPE IN A HETEROGENEOUS MULTI-LEVEL ENVIRONMENT

(75) Inventors: Lan Huang, Milpitas, CA (US); Eileen Tien Lin, San Jose, CA (US); Tina Louise Mukai, San Jose, CA (US); Amit Radheshyam Somani, San Jose, CA (US); Yang Sun, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 10/703,296

(22) Filed: Nov. 6, 2003

(65) Prior Publication Data

US 2005/0102296 A1 May 12, 2005

(51) Int. Cl.
*G06F 9/45* (2006.01)
(52) U.S. Cl. .................. 717/141; 717/100; 707/100; 707/104.1
(58) Field of Classification Search ............. 717/141, 717/142–144, 100; 707/100, 103 Z, 104.1
See application file for complete search history.

(56) References Cited

U.S. PATENT DOCUMENTS

| 5,341,476 | A | | 8/1994 | Lowell ...................... 395/200 |
|---|---|---|---|---|
| 5,737,591 | A | * | 4/1998 | Kaplan et al. ................ 707/1 |
| 5,884,312 | A | * | 3/1999 | Dustan et al. ............... 707/10 |
| 6,356,907 | B1 | | 3/2002 | Hopmann .................... 707/10 |
| 6,434,558 | B1 | | 8/2002 | MacLeod et al. .............. 707/6 |
| 6,553,380 | B2 | | 4/2003 | Minder ...................... 707/100 |
| 6,600,749 | B1 | | 7/2003 | Hayball et al. ............. 370/400 |
| 6,985,905 | B2 | * | 1/2006 | Prompt et al. .............. 707/102 |
| 7,111,016 | B2 | * | 9/2006 | Gurevich ................ 707/103 R |
| 7,257,603 | B2 | * | 8/2007 | Murman et al. .......... 707/104.1 |
| 2002/0000464 | A1 | | 1/2002 | Ramberg et al. ............ 235/375 |
| 2002/0174222 | A1 | | 11/2002 | Cox ............................ 709/224 |
| 2002/0199169 | A1 | | 12/2002 | Sokolov et al. ............. 717/116 |
| 2003/0088856 | A1 | | 5/2003 | Hoeflinger et al. ......... 717/136 |
| 2003/0152092 | A1 | | 8/2003 | Lu ............................. 370/408 |

OTHER PUBLICATIONS

Federated Databases and Systems: Part I—A Tutorial on their Data Sharing, David K. Hsiao, Aug. 22, 1991, pp. 127-179.*

(Continued)

*Primary Examiner*—Todd Ingberg
(74) *Attorney, Agent, or Firm*—Janet M. Skafar; Christine H. Smith; Megan M. Sugiyama (57) ABSTRACT

A method of determining a target data type in an environment having a plurality of levels is provided. Zero or more intermediate levels are between the source level and the target level. A target data type representing the transformation of a data type of an associated datum as the datum passes from the source level through the zero or more intermediate levels to the target level is generated. In another aspect of the invention, the datum is assigned to the target level in accordance with the target data type. In yet another aspect of the invention, the target data type is passed with the associated datum, via the zero or more intermediate levels to the target level.

8 Claims, 6 Drawing Sheets

OTHER PUBLICATIONS

Federated Databases and Systems: Part II—A Tutorial on Their Resource Consolidation, David K. Hsiao, Aug. 22, 1991, pp. 285-310.*

Semantic Heterogeneity Resolution in Federated Databases by Metadat Implantation and Stepwise Evolution, Goksel Asian et al, Apr. 20, 1999, pp. 120-132.*

Federated Database Systems for Managing Distributed, Heterogeneous, and Autonomous Databases, Amit P. Sheth et al, ACM, 1990, pp. 183-236.*

Context Interchange Overcoming the Challenge of Large-Scale Interoperable Database Systems in a Dynamic Environment, Chenh Hian Goh et al, ACM, 1994, pp. 337-346.*

Evolution Support in Large-Scale Interoperable Systems: a Metadata Driven Approach, Nick Pittas et al, IEEE, 2001, pp. 161-168.*

Using Schematically Heterogenous Structures, Renee J. Miller, ACM, 1998, pp. 189-200.*

"Using Objectiviity/C++", Objectivity, Jul. 20-4 to 20-5, 24-2 to 24-11, B-18, K-50, Jul. 16, 1996.*

D. Cornell and P.S. Yu, "Integrated Site Assignment for Relations and Join Operations in Distributed Transaction Processing," IBM Technical Disclosure Bulletin, vol. 32, No. 4A, Sep. 1989, pp. 306-314.

The Garlic Project, IBM Research, IBM Corporation, 1995, http://www.almaden.ibm.com/cs/garlic.

L.M. Haas et al., "Transforming Heterogeneous Data with Database Middleware: Beyond Integration," Bulletin of the IEEE Computer Society Technical Committee on Data Engineering, vol. 22(1), pp. 1-6, 1999, Downloaded from: http://www.almaden.ibm.com/cs/garlic.

M.J. Carey et al., "Towards Heterogeneous Multimedia Information Systems: The Garlic Approach," IBM Almaden Research Center, San Jose, CA 95120, downloaded from: http://www.almaden.ibm.com/cs/garlic, Published in: Proceedings of the International Workshop on Research Issues in Data Engineering (RIDE): Distributed Object Management, Mar. 1995, pp. 124-131.

M.L. Songini, "IBM Plans Software to Link Data From Multiple Sources," Computerworld, Jan. 13, 2003, http://www.computerworld.com/databasetopics/data/story/0,10801,77466,00.html, Computerworld.

S.H. Rutledge and J. Medicke, "Database Integration with DB2® Relational Connect, Building Federated Systems with Relational Connect and Database Views," 2001, Downloaded from: http://www7b.boulder.ibm.com/dmdd/library/techarticle/rutledge/0112rutledge.pdf.

L. Haas and E. Lin, "IBM Federated Database Technology," Mar. 2002, Downloaded from: http://www7b.boulder.ibm.com/dmdd/library/techarticle/0203haas/0203haas.html.

* cited by examiner

TECHNIQUE FOR DETERMINING A TARGET DATA TYPE IN A HETEROGENEOUS MULTI-LEVEL ENVIRONMENT

BACKGROUND OF THE INVENTION

1. Field of the Invention

The invention relates to a technique, specifically a method, apparatus, and article of manufacture that implements the method, to determine a target data type in a heterogeneous environment.

2. Description of the Related Art

Computer software systems typically process data. For example, a computer software system may be an application program or a "system" program. Examples of application programs include, and are not limited to, an information integration system, a database management system, and a spreadsheet program. Examples of system programs include, and are not limited to, an operating system and a file system. Typically, an application program relies on at least a portion of a system program to perform its function. Some computer software systems may be coupled to a repository to store data in persistent storage.

In a computer software system, data is typically associated with a data type that defines the data. Some exemplary data types include, and are not limited to, a numeric type, string type, a date type, a time type, and a binary large object type. Some exemplary numeric data types include, and are not limited to, integer, short integer, long integer and floating point.

Figure 1:
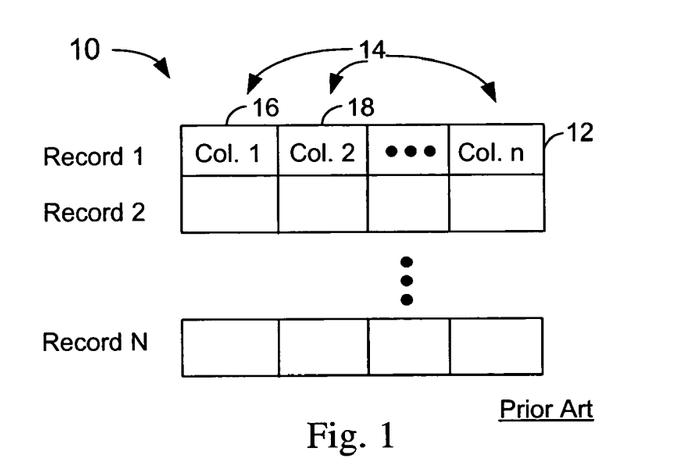
FIG. 1 depicts an exemplary table in accordance with the prior art.

In FIG. 1, an exemplary database table 10 of a database management system has rows 12 and columns 14 to store data. A row 12 is also referred to as a record. A data type is associated with each column to define the type of data that is contained in that column. For example, the data type for column one 16 is integer and the data type for column two 18 is string.

In a heterogeneous environment, data may be stored in various repositories. The repositories include, and are not limited to, the tables of database management systems, spreadsheet files, flat files, text files such as email, extensible markup language (XML) documents, web pages, image files, and audio or video data files. A repository may be a source of data for a query, and a target when a data value is assigned in an update or an insert. A single query may be used to retrieve data located on any one, or a combination, of the data sources. The repositories may represent the same or related data differently. In other words, related data from different repositories may have different data types.

Typically, in a heterogeneous environment, the data types supported in various software systems and the semantics related to the data types are highly diverse. Different software systems may associate different data types with the same or related data. When data is transferred between software systems, the software systems typically transform the data type of the input data, and output the data with a data type that is different from what was input. In addition, the software systems may be interconnected by software interfaces that may transform the data type of the data as it passes through the interface. Therefore, a consistent view and behavior related to the data may not be provided.

The updating or inserting of data into a repository is referred to as an assignment. When assigning data in a heterogeneous environment, the semantics for the assignment of the data as it passes through various software systems and interfaces are unclear, and the result of the assignment is inconsistent and unpredictable. The source data may pass through multiple levels of software systems and interfaces before reaching a target repository at the lowest level. In the process, the data type associated with the data may be altered multiple times. The uncertainty of when and how the data type is altered may produce inconsistent and unpredictable results for the assignment.

In addition, when an assignment updates or inserts data into multiple repositories, the semantics to determine the target type in the multiple repositories are unclear and may produce inconsistent results. For example, when integrating data from multiple repositories, data having different data types in different software systems is presented as a "union all" view to provide a single uniform view of the data. When data is assigned across the underlying target software systems of the union, the data type may vary across the underlying target software systems inconsistently and unpredictably.

Some software systems use a data type mapping mechanism to map data types between different software systems. For example, when mapping tables of different database management systems, the data types are individually mapped column-by-column. Using this data type mapping mechanism, data in one software system can be viewed from another software system; however, the assignment semantics are unclear and the results of an assignment are inconsistent and unpredictable.

Therefore, there is a need for a method, apparatus and article of manufacture implementing the method, to provide consistent and predictable results when assigning data in a heterogeneous environment. The technique should also provide consistent and predictable results when assigning data to a target computer system in a multi-level environment. In addition, the technique should provide consistent and predictable results when assigning data in a multi-target environment.

SUMMARY OF THE INVENTION

To overcome the limitations in the prior art described above, and to overcome other limitations that will become apparent upon reading and understanding the present specification, the present invention provides a method, apparatus, and article of manufacture for determining a target data type in an environment having a plurality of levels. Zero or more intermediate levels are between a source level and a target level. A target data type representing the transformation of a data type of an associated datum as the datum passes from the source level through the zero or more intermediate levels to the target level is generated.

In another aspect of the invention, the datum is assigned to the target level in accordance with the target data type. In yet another aspect of the invention, the target data type is passed with the associated datum, via the zero or more intermediate levels to the target level.

In another alternate aspect of the invention, the environment comprises an additional target level and zero or more additional intermediate levels. The zero or more additional intermediate levels are between the source level and the additional target level. An additional target data type representing the transformation of the data type of the associated datum as the datum passes from the source level, through the zero or more additional intermediate levels to the additional target level is generated.

In this way, data can be assigned across multiple targets and through multiple levels to provide consistent and predictable results in a heterogeneous environment.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to some of the figures.

DETAILED DESCRIPTION OF THE PREFERRED EMBODIMENTS

After considering the following description, those skilled in the art will clearly realize that the present invention can be utilized to assign data in substantially any environment which associates different data types with the same or related data. A technique determines a target data type for a datum in an environment having a plurality of levels. Zero or more intermediate levels are between a source level and a target level. A target data type representing the transformation of the data type for an associated datum is generated. The target data type represents the transformation of the data type as the datum passes from the source level, through zero or more intermediate levels to the target level.

Figure 2:
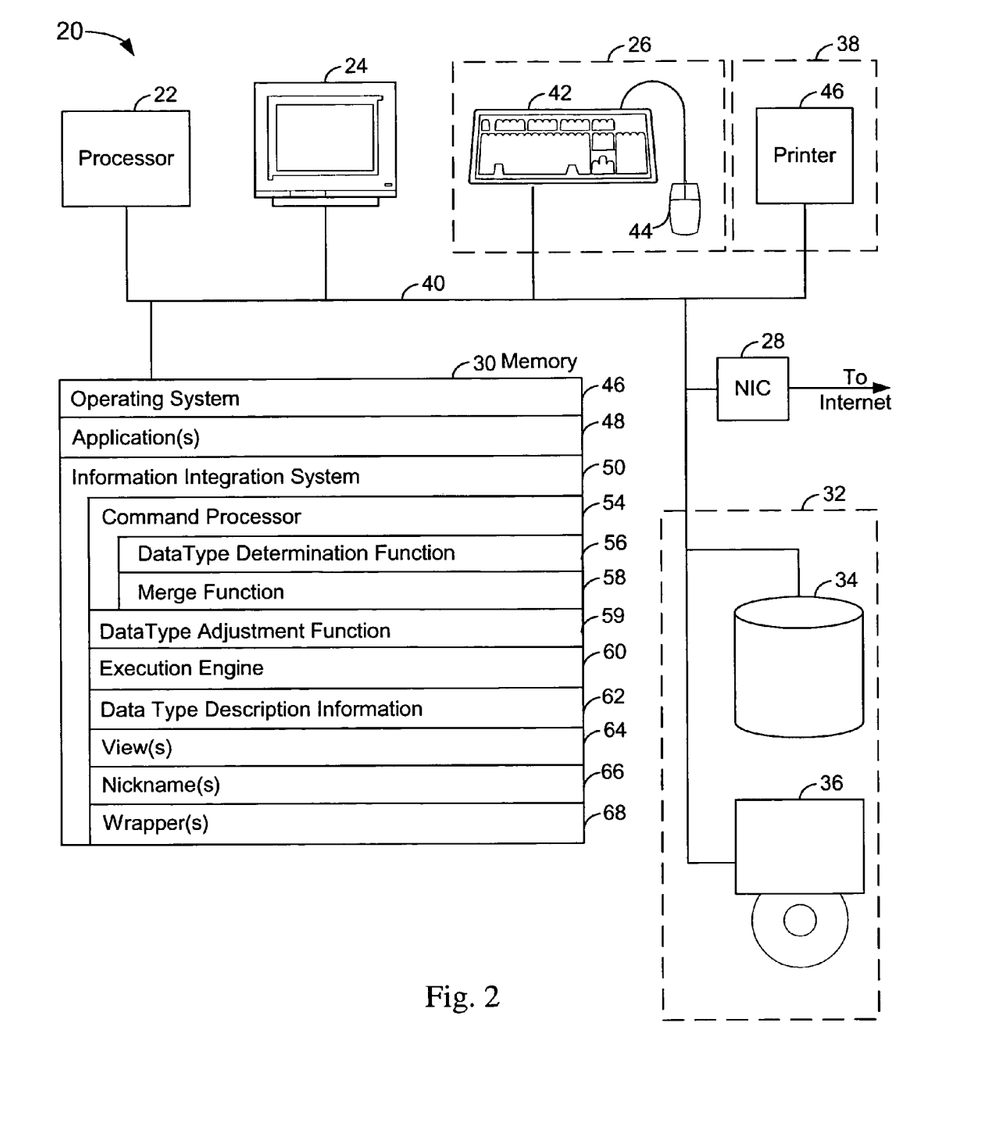
FIG. 2 depicts an illustrative computer system having an information integration system that uses the teachings of the present invention.

FIG. 2 depicts an illustrative computer system 20 that utilizes the teachings of the present invention. The computer system 20 comprises a processor 22, display 24, 15 input interfaces (I/F) 26, communications interface 28, memory 30, disk memories 32 such as hard disk drive 34 and optical disk drive 36, and output interface(s) 38, all conventionally coupled by one or more busses 40. The input interfaces 26 comprise a keyboard 42 and mouse 44. The output interface is a printer 38. The communications interface 28 is a network interface card (NIC) that allows the computer 20 to communicate via a network, such as the Internet.

The memory 30 generally comprises different modalities, illustratively semiconductor memory, such as random access memory (RAM), and disk drives. The memory 30 stores an operating system 46, one or more application programs 48, and an information integration system 50. For example, the operating system 46 may be implemented by any conventional operating system, such as Z/OS® (Registered Trademark of International Business Machines Corporation), AIX® (Registered Trademark of International Business Machines Corporation), UNIX® (UNIX is a registered trademark in the United States and other countries licensed through X/Open Company Limited), WINDOWS® (Registered Trademark of Microsoft Corporation) and LINUX® (Registered trademark of Linus Torvalds).

The information integration system 50 allows a user to execute commands to assign data to, delete data from, or query the data stored in repositories. In one embodiment, the commands are Structured Query Language (SQL) statements that conform to a Structured Query Language standard as published by the American National Standards Institute (ANSI) or the International Standards Organization (ISO). In alternate embodiments, languages other than SQL may be used. Typically, a repository is queried using a SQL SELECT statement, and data is assigned to a repository using a SQL INSERT or UPDATE statement. In a more particular embodiment, the inventive technique is used in the information integration system 50, which in one embodiment is included in IBM® DB2® Information Integrator (IBM and DB2 are registered trademarks of International Business Machines Corporation). However, the inventive technique is not meant to be limited to the IBM DB2 Information Integrator, and may be used in other information integration systems. Alternately, the inventive technique may be used in systems other than information integration systems.

In the memory 30, the operating system 46, applications 48 and information integration system 50 are comprised of instructions and data. The specific software instructions that implement the present invention are incorporated in the information integration system 50. Generally, the information integration system 50 software is tangibly embodied in a computer-readable medium, for example, memory 30 or, more specifically, one of the disk drives 32, and is comprised of instructions which, when executed by the processor 22, cause the computer system 20 to utilize the present invention.

In one embodiment, the memory 30 may store a portion of the software instructions and data in semiconductor memory, while other portions of the software instructions and data are stored in disk memory. In some embodiments, the memory 30 stores the following:

The operating system 46;

The applications 48;

The information integration system 50 which comprises:

A command processor 54 that receives a SQL statement, parses the statement and determines an appropriate execution plan to perform the SQL statement;

A data type determination function 56, which is invoked by the command processor 54, to generate a final target data type of transformation functions representing the transformation of a data type of an associated datum through at least one level;

A merge function 58 to merge the transformation functions of the final target data type;

A data type adjustment function 59 to adjust a data type associated with a transformation function;

An execution engine 60 that executes the execution plan, or causes the execution plan to be executed;

Data type description information 62 comprising, for each level, the data in that level and its associated data type;

One or more information integration system views 64 to provide a uniform interface to at least a subset of the data stored in the repositories of a heterogeneous environment;

One or more nicknames 66 that are used to reference a table or view belonging to a software system; and One or more wrappers 68 that provide interfaces to one or more external systems, respectively.

The present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device or media. Those skilled in the art will recognize that many modifications may be made to this configuration without departing from the scope of the present invention.

Those skilled in the art will recognize that the exemplary computer system illustrated in FIG. 2 is not intended to limit the present invention. Other alternative hardware environments may be used without departing from the scope of the present invention.

Figure 3:
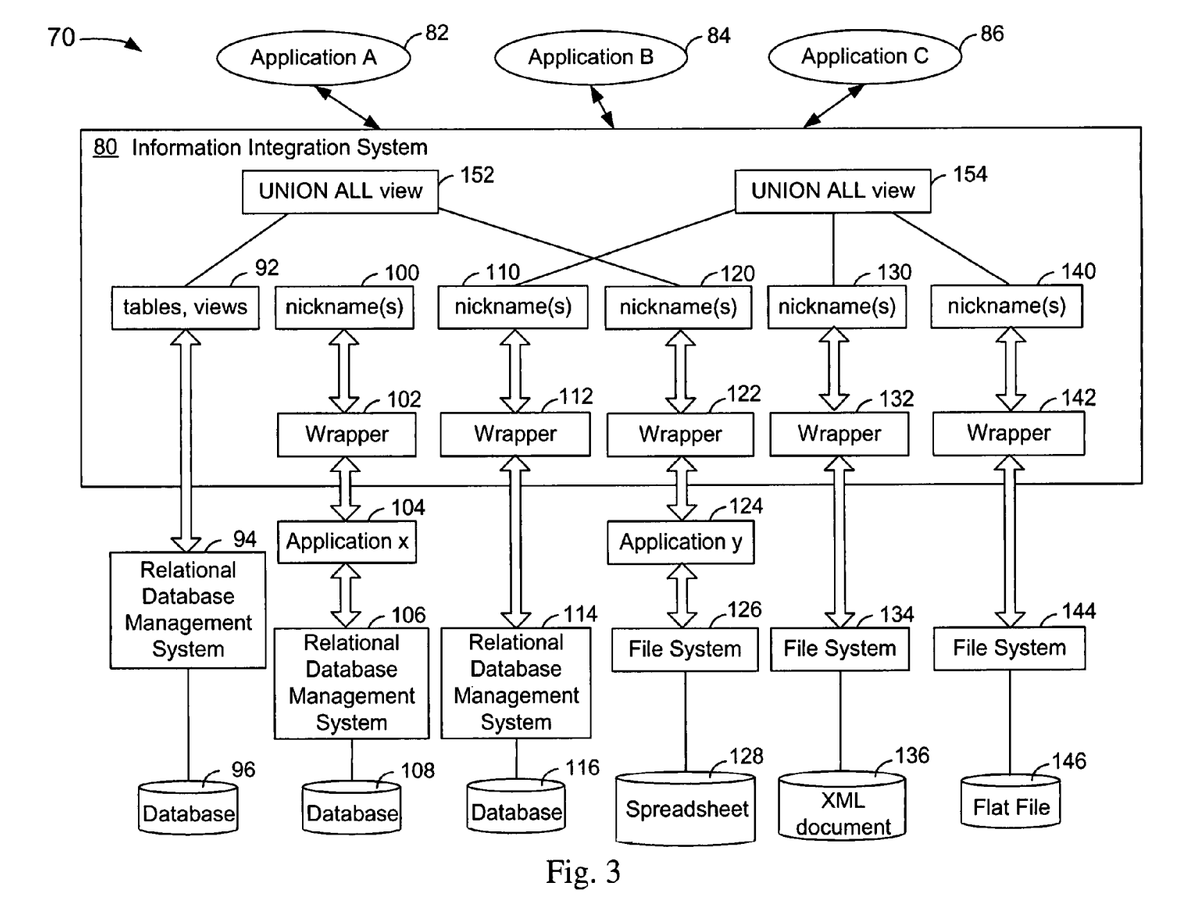
FIG. 3 depicts an embodiment of the information integration system of FIG. 2 in an illustrative heterogeneous environment.

FIG. 3 depicts an exemplary heterogeneous environment 70 having an information integration system 80 that uses the present invention. Applications A, B and C, 82, 84 and 86, respectively, communicate with the information integration system 80. In the information integration system 80, tables and views 92 provide an interface to a local, first relational database management system (RDBMS) 94 which is coupled to a first repository 96, that is, a database that stores tables. Alternately, the first RDBMS 94 is part of the information integration system 80.

The information integration system 80 communicates with various additional repositories through various levels of software systems and interfaces. One type of interface is a wrapper that provides an interface for the information integration system to one or more software systems. The lowest level typically has a repository. For example, a first set of nicknames 100 interfaces with a first wrapper 102 which provides an interface to a first application program (Application x) 104, which communicates with a second relational database management system (RDBMS) 106 and a second database repository 108. A second set of nicknames 110 interfaces with a second wrapper 112 which provides an interface to a third relational database management system 114 and a third database repository 116. A third set of nicknames 120 interfaces with a third wrapper 122 which provides an interface to a second application program (Application y) 124 which communicates with a first file system 126 and a fourth repository 128, a spreadsheet file. A fourth set of nicknames 130 interfaces with a fourth wrapper 132 which provides an interface to a second file system 134 and a fifth repository 136, an XML document. A fifth set of nicknames 140 interfaces with a fifth wrapper 142 which provides an interface to a third file system 144 and a sixth repository 146, a flat file.

In the information integration system, first and second views 152 and 154, respectively, aggregate the data from various repositories for the applications 82, 84 and 86. The first and second views 152 and 154 were created with a UNION ALL SQL statement. The first view 152 aggregates data from the first relational database management system 94 and the spreadsheet 128. The second view 154 aggregates data from the third relational database management system 114, the XML document 136 and the flat file 146. Data can be transferred among the multiple levels of views, interfaces and software systems.

The application programs can assign data in many ways. For example, Application A 82 can select data from the first database table 96 and assign that data to the spreadsheet 128. Application B 84 can select data from the XML document 136 and assign that data to the third relational database 116 via at least one of the nicknames 110. Application C 86 can select data from the flat file 146 and assign that data through the UNION ALL view 154 to the XML document 136 and the third database table 116.

Data assigned by an application 82, 84, and 86, will pass through the various levels of the heterogeneous environment. In general, levels $L_1$ to $L_n$ comprise any software system, module, object, and interface. More particularly, a level comprises at least one or a combination of a table name, a view, a nickname, a wrapper, an application program, a relational database management system and a file system, depending on the embodiment.

For example, when application A 82 assigns a datum $D_A$ having a data type of $t_0$ to the spreadsheet 128, after the information integration system 80 passes the datum $D_A$ to the UNION ALL view 152 and one of the nicknames 120, datum $D_A$ passes through the wrapper 122, the application y 124 and the file system 126 to store the datum $D_A$ in the spreadsheet file 128. Without using the present inventive technique, during the assignment, the data type $t_0$ of the datum $D_A$ may be changed by any of the first UNION ALL view 152, the nickname 120, the wrapper 122, application y 124 and the file system 126. For instance, the information integration system 80 reads a part length, from a part length column, as a source value from one of the tables of the first database 96, and the part length has a data type of decimal with thirty-one digits including a six digit mantissa and a twenty-five digit characteristic, in other words, the data type $t_0$ is equal to decimal(31.6). In the information integration system 80, the part length has the same data type as the part length that was read from the table of the first database 96. Therefore, the data type $t_1$ of the information integration system 80, level one, is the same as the initial data type $t_0$ which is equal to decimal(31.6). The information integration system 80 passes the part length to the wrapper 122, that is, level two, which outputs the part length with a data type, $t_2$, of float to application y 124. Application y 124, the third level, receives the input data type of float for the part length from the wrapper 122. Application y 124 processes the part length, and outputs the part length to the file system 126 with data type $t_3$ which is equal to decimal(31.6). The file system 126 stores the length in the spreadsheet as data type $t_4$ which is equal to decimal(31.6). Therefore, without the present invention, the data type is not controlled as the data passes through the various levels and data may not be stored with consistent and predictable results.

The present inventive technique achieves consistent and predictable results by forcing a data type for a value of data through the path of an assignment.

Figure 4:
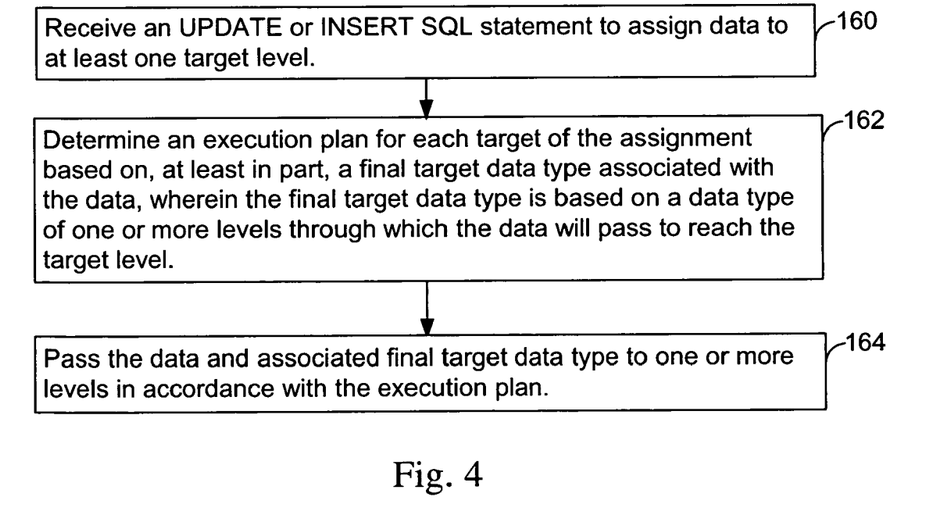
FIG. 4 depicts a high-level flowchart of an embodiment of the processing of an assignment statement in the integration information system of FIG. 2.

FIG. 4 depicts a high-level flowchart of an embodiment of the processing of an assignment statement in the information integration system 50 of FIG. 2. Referring also to FIG. 2, in step 160, the information integration system 50 receives an UPDATE or an INSERT SQL statement to assign data to at least one target level. In step 162, in the information integration system 50, the command processor 54 determines an execution plan for each target of the assignment based on, at least in part, a final target data type associated with the data. The command processor 54 invokes the data type determination function 56 to generate the final target data type based on a transformation function of one or more levels through which the data will pass to reach the target level. In step 164, for each target level of the assignment, the command processor 54 passes the data and the final target data type to the next level in accordance with the execution plan. Each level passes the data and the associated final target data type to the next level until the target level is reached.

The generation of the final target data type will now be described.

Suppose that a source datum D with data type $t_0$ is to be assigned to a target level $L_n$, through intermediate levels $L_1$, $L_2$, ..., $L_{n-1}$. Without the present inventive technique, the levels $L_1$, $L_2$, ..., $L_n$ output datum D with a data type of $t_1$, $t_2$, ..., $t_n$, respectively. For each level, the information integration system stores data type description information comprising the data types associated with columns of tables, fields, groups of spreadsheet cells, for example columns or rows of a spreadsheet file, or other subsets of data. To determine the data type and transformation function of each level $L_i$, the command processor 54 retrieves the associated data type $t_i$ for the data from the data type description information 62. In one embodiment, the command processor 54 passes the associated data types $t_1$, $t_2$, ..., $t_n$, to the data type determination function 56.

A transformation function $T_i(x)$ changes an input data type of x to a data type of $t_i$ for a given datum for level i. In other words, for a level i, a transformation function is based on the data type $t_i$ such that $T_i(x) = t_i$. The final target data type $T_{final}$ is determined as a composite function of transformation functions as follows:

$$T_{final} = T_n(T_{n-1}(\ldots(T_2(T_1(t_0)))\ldots)).$$

In one embodiment, the final target data type, $T_{final}$, is applied using the system's or level's built-in casting function. In some embodiments, the data type of the source datum D is forced to the final target data type, $T_{final}$, using one or more user-defined casting function calls.

Referring back to FIG. 3, the inventive technique will now be applied to the example above to assign a datum D to the spreadsheet file. The transformation function $T_1(x)$ of the information integration system 80 through the nickname is represented as follows: $T_1(x) = t_1 = decimal(31.6)$. The transformation function $T_2(x)$ of the wrapper 122 is represented as follows: $T_2(x) = float$. The transformation function $T_3(x)$ for Application y 124 is represented as follows: $T_3(x) = decimal(31.6)$. The transformation function $T_4(x)$ of the file system 126 is represented as follows: $T_4(x) = decimal(31.6)$. The final target data type $T_{final}$ is determined as follows:

$$T_{final} = decimal(31.6)(decimal(31.6)(float(decimal(31.6)))).$$

The information integration system 80 can choose where an assignment occurs to improve performance depending on the cost and the capability of the underlying systems or levels. For example, the information integration system 80 may decide to assign a source data value from a database system to the spreadsheet file 128 by returning the source data value to the information integration system 80, and passing the source data value with the final target data type via the nickname 120, wrapper 122, application y 124, and file system 126 to the target level, the spreadsheet file 128. Alternately, the information integration system 80 may choose to have application y 124 read the source data value from a database and write the source data in the spreadsheet file 128 directly. The technique passes the final target data type to application y 124. Because the information integration system 80 forces the data type of the assignment to the final target data type, $T_{final}$, throughout the entire path of the assignment, values stored in a target level are consistent and predictable.

Figure 5:
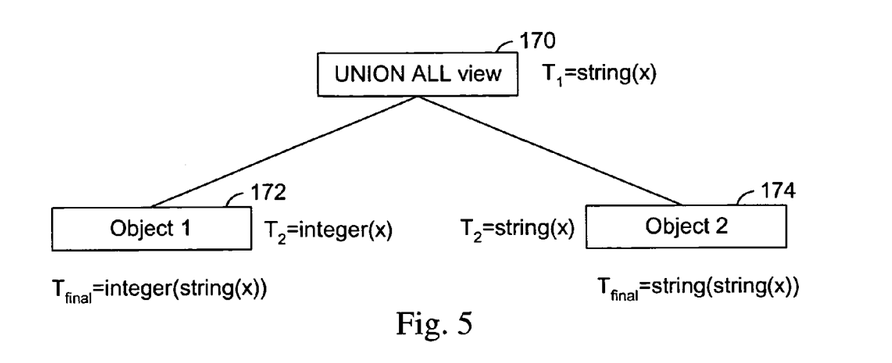
FIG. 5 depicts an exemplary UNION ALL view.

FIG. 5 depicts an update of an exemplary view 170 for an application using the information integration system. The view 170 aggregates data from first and second objects, object 1 172 and object 2 174, respectively. As will be seen below, the view 170 was created using a UNION ALL SQL statement over first and second objects, Object 1 and Object 2, 172 and 174, respectively. In this embodiment, the objects can be any updateable objects, tables, views, nicknames, interfaces, wrappers, software applications, or software systems. The UNION ALL view can also associate a data type with an object that is different from the underlying objects to provide a unified view of the underlying objects. The first and second objects, 172 and 174, are defined as follows:

Object 1: table t1 with column named phone_number_column as integer

Object 2: view v1 with column named phone_number_column as string.

The following exemplary SQL statements create the UNION ALL view 170, union_all_v1:

CREATE VIEW union_all_v1 AS
SELECT char(phone_number_column) FROM t1
UNION ALL
SELECT phone_number_column FROM v1

In the UNION ALL view above, union_all_v1, 170, the data type of the phone number column is set to string.

The technique allows an update to be performed using a view while maintaining data consistency. For example, the phone_number_column may be updated through the UNION ALL view, union_all_v1, 170. When application C issues a SQL UPDATE statement to update the phone_number_column through the union_all_v1 view 170, the information integration system performs two updates. In each update, the final target data type is determined based on the data type of the column in the UNION ALL view and the data types in the database objects. In particular, for object 1 172, the final target data type is equal to integer(string). For object 2 174, the final target data type is equal to string (string), which can be reduced to string. A new value for a variable called new_phone_number can be of data type integer, string or another compatible data type. In this example, the information integration system performs the two updates as follows:

update t1 set phone_number_column=integer(string (new_phone_number));
update v1 set phone_number_column=string(new_phone_number);

For update t1, the final target data type, $T_{final}$, is equal to integer(string) and has the effect of forcing the final data type of new_phone_number to an integer by casting the value of the variable, new_phone_number, as a string then as an integer. As can be seen from the update above, the entire final target data type with the source datum is passed through each level to the final target level which, in one embodiment, enforces the cast. In this way, the data type of the value of new_phone_number is explicitly specified and controlled to provide consistent results.

For update v1, the final target data type, $T_{final}$, is equal to string( ). The final target data type with the source datum is passed to each level to the final target level which enforces the cast. In this way, the final target data type is enforced and stored in the target repository, and has a consistent value.

Figure 6:
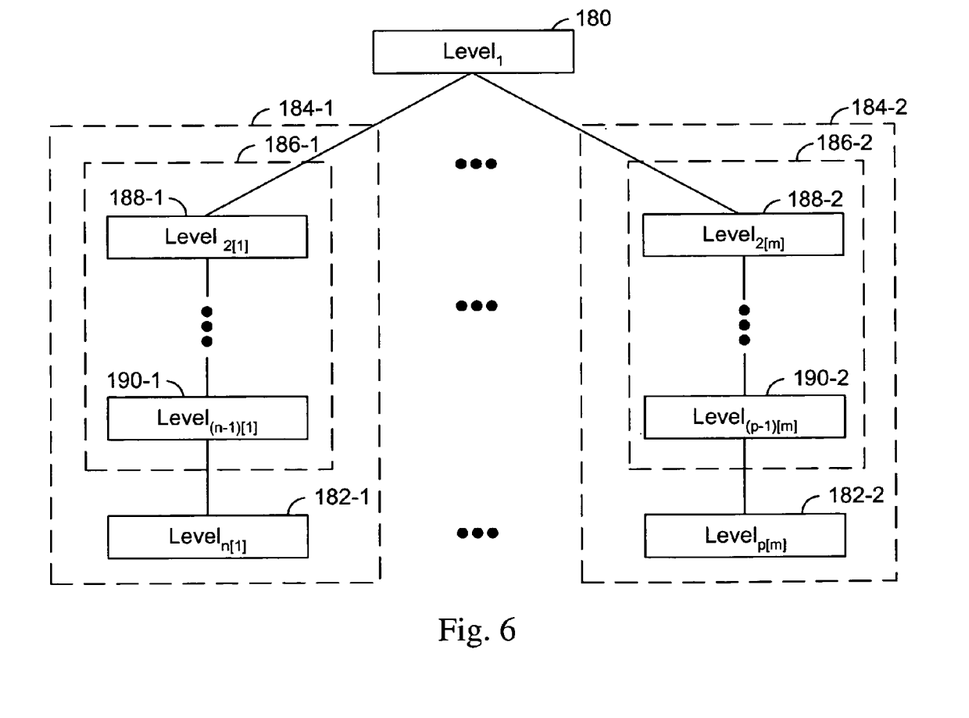
FIG. 6 depicts a more general diagram of a source level having multiple target levels.

FIG. 6 depicts a more general diagram of a source level, $Level_1$, 180 being associated with multiple target levels, first through $m^{th}$ target levels, $Level_{n[1]}$, and $Level_{p[m]}$, 182-1 and 182-2, respectively. The level number preceeds the left bracket. The source level 180 is associated with "m" target levels, the target number is designated between the brackets. The number of target levels "m" is greater than or equal to two. The source level, $Level_1$, 180, is associated with multiple, m, branches 184. A first branch 184-1 comprises the first target level, Level$_{n[1]}$, 182-1, and first set of intermediate levels, 186-1. An m$^{th}$ branch 184-2 comprises the m$^{th}$ target level, Level$_{p[m]}$, 182-2, and m$^{th}$ set of intermediate levels, 186-2. The first through m$^{th}$ sets of intermediate levels, 186-1 and 186-2, are between the source level 180 and the m target levels, Level$_{n[1]}$ through Level$_{p[m]}$, 182-1 and 182-2, respectively. The sets of intermediate levels 186-1 and 186-2, may have any number of levels. For example, the first set of intermediate levels 186-1 comprises Level$_{2[1]}$ 188-1 to Level$_{(n-1)[1]}$ 190-1, and the m$^{th}$ set of intermediate levels comprises Level$_{2[m]}$ 188-2 to Level$_{(n-1)[m]}$ 190-2. Alternately, the first through m$^{th}$ sets of intermediate levels, 186-1 and 186-2, respectively, have at least one level. In another embodiment, the source level 180 communicates directly with the target level, Level$_{n[1]}$ and Level$_{p[m]}$, 182-1 and 182-2, respectively, without passing data through a set of intermediate levels.

In one embodiment, the source level, Level$_1$, 180 is a view and data is assigned through the source level. More particularly, the source level, Level$_1$, 180 is a UNION ALL view. A final target data type is generated for each target level as described above. For each target level, the final target data type for that target level and the data are passed to the next level associated with the target level towards the target level. Each subsequent level passes the final target data type with the data to the next level until the target level is reached. In another embodiment, in which the source level directly communicates with the target level, the source level passes the final target data type for that target level with the data directly to the target level.

Alternately, the source level, Level$_1$, 180 comprises any software system, module, object, and interface. More particularly, the source level, Level$_1$, 180 comprises at least one or a combination of a table name, a view, a nickname, a wrapper, an application program, a relational database management system and a file system, depending on the embodiment.

Figure 7:
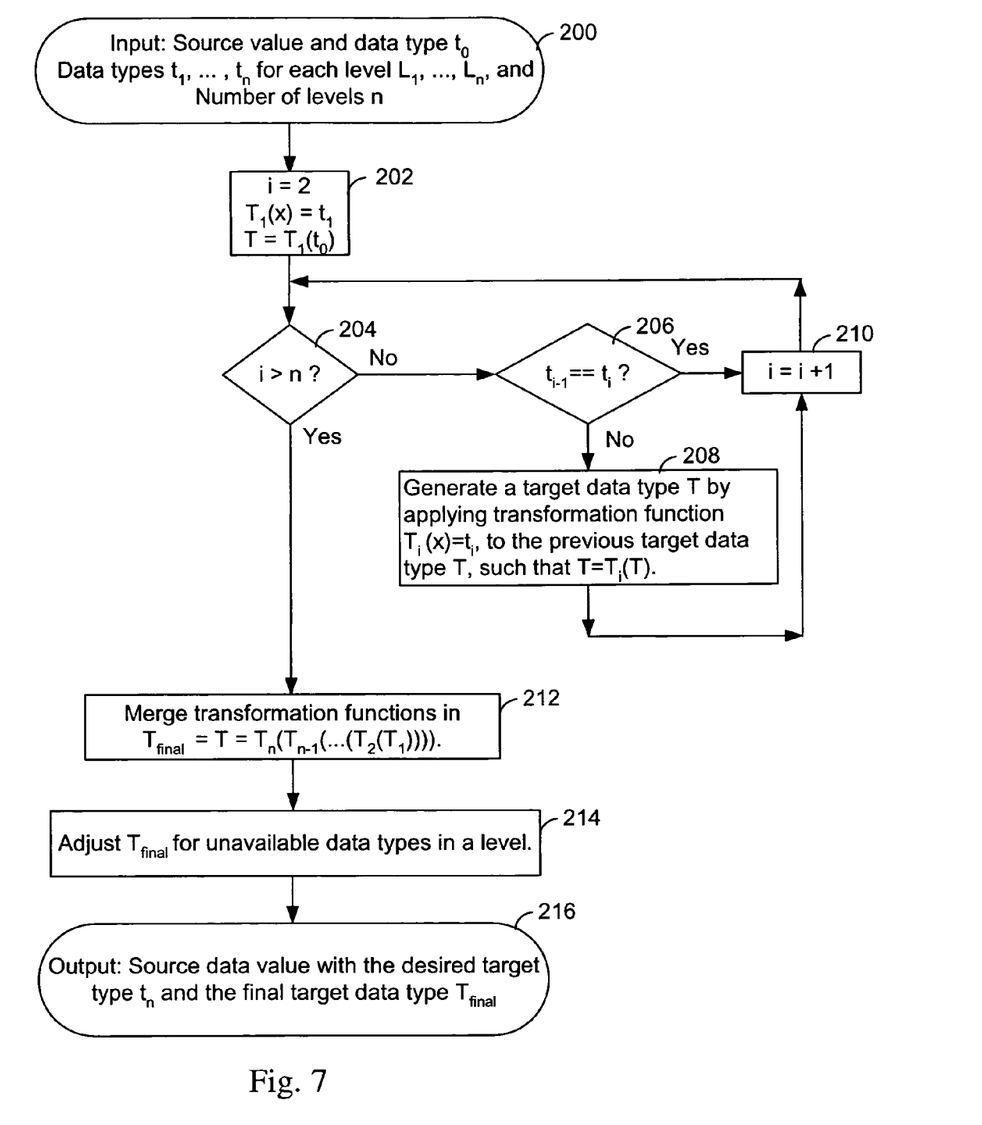
FIG. 7 depicts a flowchart of an embodiment of a technique to determine a target data type by generating a final target data type based on data type transformation functions for respective levels.

FIG. 7 depicts a flowchart of an embodiment of the data type determination function of FIG. 2 which generates the final target data type T$_{final}$. In one embodiment, the data type determination function iteratively generates the final target data type T$_{final}$.

Initially, in step 200, a source value or datum D and data type to are provided. In addition, the intermediate level data types $t_1$ to $t_{n-1}$, that are associated with the intermediate levels through which the datum will pass, $L_1$ to $L_{n-1}$, respectively, are provided. The number of levels, n, and the data type $t_n$ that is associated with the target level, $L_n$, are also provided.

When an object is created in the information integration system, the data type information associated with that object and each of the levels associated with the object, is provided. The information integration system registers and stores the data type information in column type descriptors. The data type description information comprises the data type information, and in particular, the data types, stored in the column type descriptors. During assignment, the command processor retrieves the data types $t_1$ to $t_n$ from the data type description information for the column associated with the datum D for a level i.

In step 202, the value of a level counter, i, is set equal to two to refer to a second level, the first transformation function T$_1$(x) is set equal to $t_1$, and the target data type T is set equal to T$_1$(t$_0$). In step 204, the data type determination function determines whether the value of the counter i is greater than the value of n. If not, in step 206, the data type determination function determines if the data type of the previous level, $t_{i-1}$, is equal to the data type of the current level, $t_i$. If not, in step 208, the data type determination function generates the target data type T. Transformation function T$_i$(x) is equal to $t_i$. The data type determination function applies the transformation function T$_i$( ) to perform the cast from $t_{i-1}$ to $t_i$. In other words, the target data type T is equal to T$_i$(T). In step 210, the value of the counter i is incremented by one and the data type determination function proceeds to step 204.

If, in step 206, the data type determination function determined that data type $t_{i-1}$ is the same as data type $t_i$, the final target data type is not updated and the data type determination function proceeds to step 210. In an alternate embodiment, step 206 is omitted and step 204 proceeds to step 208.

If step 204 determined that the value of the counter, i, is greater than the value of n, the final target data type has been generated. The target data type T is now also referred to as the final target data type. In step 212, transformation functions in the final target data type may be merged. In one embodiment, the data type determination function invokes the merge function 58 of FIG. 2. Alternately, step 212 is not performed.

In step 214, transformation functions are adjusted for unavailable data types in a level. In one embodiment, the data type determination function invokes the data type adjustment function 59 of FIG. 2. In another particular embodiment, when a lower level does not have a data type associated with a transformation function of the final target data type in the current level, the current level adjusts the final target data type before passing the final target data type to the next level. Alternately, step 214 is not performed. In another embodiment, step 214 is performed prior to step 212. In step 216, the data type determination function outputs the source datum with the target data type of the target level $t_n$, and the final target data type T$_{final}$.

In particular, in step 214 of FIG. 7, the information integration system provides a data type mapping mechanism which maps a data type in the next lower level to a data type supported by the current level. When the two levels both support the same data types, the mapping is an exact data type mapping. When two levels do not support the same data types, the mapping is an inexact mapping, and in particular, a closest data type mapping. The information integration system also provides a function mapping mechanism which maps a function from one level to another level. In one embodiment, the function mapping and data type mapping mechanisms are used by the information integration system to pass the data and commands to the lower level to be executed. In another embodiment, the data type adjustment function implements the data type mapping mechanism, and, alternately, the function mapping mechanism.

For example, assume that, at the current level, a final target data type for assigning a value to a target level is as follows:

$$T_{final}=\text{decimal}(31.2)(\text{float}(\text{decimal}(31.6)(\text{decimal}(31.6)))).$$

If the next lower level does not have a data type that exactly matches any of the data types associated with the transformation functions of the final target data type in the current level, the data type adjustment function chooses the closest data type to the data type at the next level. In this example, the fourth level does not provide a data type of "float". Therefore, in the third level, the third transformation function T$_3$(x)=float is replaced with another transformation function $T_c(x)$. In this example, the data type adjustment function chooses decimal(31.2) as the closest data type to that of "float". The final target data type is as follows:

$$T_{final}=\text{decimal}(31.2)(\text{decimal}(31.2)(\text{decimal}(31.6)(\text{decimal}(31.6)))).$$

The final target data type shown above is passed from the third level to the fourth level with the source data.

Each level passes the source data and the final target data type, $T_{final}$, with any adjustments to the transformation functions, to the next lower level associated with the assignment of the source data. In this way, even with adjustments to the final target data type, no matter where the assignment happens, data is assigned consistently.

Figure 8:
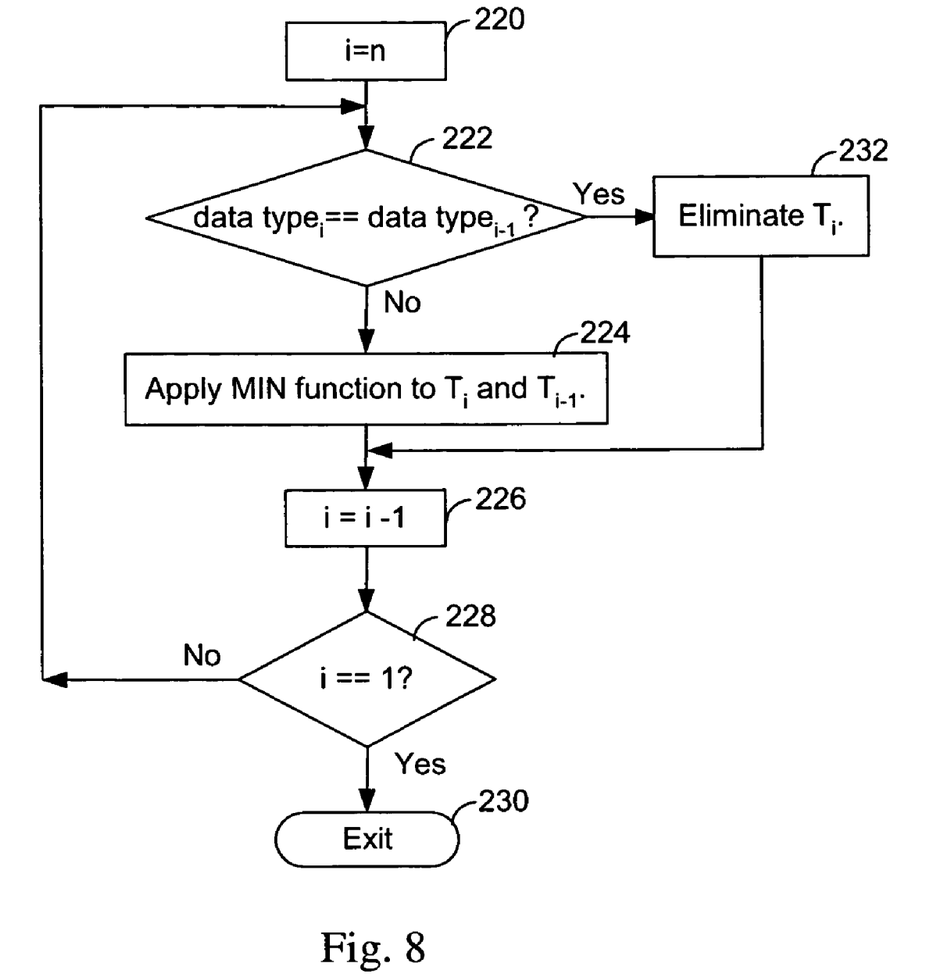
FIG. 8 depicts a flowchart of an embodiment of the merging of data type transformation functions in the final target data type of FIG. 7.

FIG. 8 depicts a flowchart of an embodiment of the merge function 58 of FIG. 2 that is used in step 212 of FIG. 7. A MIN function is used to merge transformation functions within the final target data type. In another embodiment, the merge function also eliminates redundant transformation functions. When the transformation functions $T_{i+1}(T_i(\ldots))$ of the final target data type are eliminated and merged, the amount of time to evaluate the final target data type is reduced. Transformation functions are merged and eliminated by iteratively applying the MIN function. The MIN function has rules for combining data types and is described in further detail below. The transformation function $T(x)$ changes data type x to data type t. In the following description, a transformation function $T_i(x)$ will also be referred to as $T_i$. The MIN function is applied to successive transformation functions of the final target data type, $T_i$ and $T_{i+1}$, as follows:

$$T_{i+1}(t_i) \Rightarrow \text{MIN}(t_i, t_{i+1}).$$

The MIN function, MIN(data type$_i$, data type$_{i+1}$), is further defined below. Some general rules for the definition of MIN(data type$_i$, data type$_{i+1}$) are as follows:

if data type$_i$=data type$_{i+1}$, then MIN(data type$_i$, data type$_{i+1}$)=data type$_i$=data type$_{i+1}$    (1)

MIN(data type$_i$, data type$_{i+1}$)=MIN(data type$_{i+1}$, data type$_i$)    (2)

MIN(data type$_i$, data type$_{i+1}$, . . . , data type$_n$)=MIN (data type$_i$, MIN(data type$_{i+1}$, . . . , data type$_n$)).    (3)

In particular, when general rule (1) is applied, two successive data types that are the same are merged into a single data type. Therefore general rule (1) eliminates redundant data types. General rule (2) illustrates the commutative property of the MIN function. General rule (3) illustrates how data types can be successively merged by applying the MIN function.

In FIG. 8, in step 220, the value of a counter i is set equal to the value of n, the maximum number of transformation functions in the final target data type. Step 222 determines whether data type$_i$ is equal to data type$_{i-1}$. If not, in step 224, the MIN function is applied to $T_i$ and $T_{i-1}$ to merge $T_i$ and $T_{i-1}$. The application of the MIN function is described in further detail below. In step 226, the value of the counter i is decremented by one. Step 228 determines whether the value of the counter i is equal to one. If not, step 228 proceeds to step 222. If the value of the counter i is equal to one, the merge function exits (step 230). If step 222 determined that data type$_i$ is equal to data type$_{i-1}$, then transformation function $T_i$ is eliminated and the merge function proceeds to step 232.

In an alternate embodiment, if the data type determination function already has eliminated redundant transformation functions, prior to step 220, the value of n is adjusted to reflect the reduced number of transformation functions, and step 222 is omitted.

Tables one, two and three, below, show additional rules for the MIN function. In one embodiment, the rules are implemented in a look-up table. Alternately, the rules are coded as part of the program logic in the merge function. In the tables below, the data type, decimal(x,y) refers to a number having x digits of which y form a mantissa. For example, decimal(31.6) refers to a decimal number having a twenty-five digit characteristic and a six digit mantissa.

TABLE 1

MIN function for numeric data types

| Data type$_i$ | Data type$_{i+1}$ | MIN(Data type$_i$, Data type$_{i+1}$) |
|---|---|---|
| SMALLINT | SMALLINT or INTEGER or BIGINT or REAL or DOUBLE | SMALLINT |
| INTEGER | BIGINT or REAL or DOUBLE | INTEGER |
| BIGINT | REAL or DOUBLE | BIGINT |
| REAL | DOUBLE | REAL |
| DECIMAL(w, x) | SMALLINT | DECIMAL(p, 0) where p = w − x, if p < 5; SMALLINT, otherwise |
| DECIMAL(w, x) | INTEGER | DECIMAL(p, 0) where p = w − x, if p < 11; INTEGER, otherwise |
| DECIMAL(w, x) | BIGINT | DECIMAL(p, 0) where p = w − x, if p < 19; BIGINT, otherwise |
| DECIMAL(w, x) | DECIMAL(y, z) | DECIMAL(p, s) where p = min(x, z) + min(w − x, y − z), s = min(x, z) |
| DECIMAL(w, x) | DOUBLE or REAL | DECIMAL(w, x) |

The min function, min(a,b), selects the smallest of a set of values {a, b}.

The following is a special case for combining transformation functions. If MIN(data type$_i$, data type$_{i+1}$)=decimal (0,0), the two transformation functions are not merged if decimal (0,0) is an invalid data type in the level. The application of MIN(data type$_i$, data type$_{i+1}$) results in DECIMAL(0,0) when data type$_i$ is equal to DECIMAL(n,n) and data type$_{i+1}$ is equal to any integer data type or DECIMAL (w, 0).

The following table depicts the rules of the MIN function for merging character strings.

TABLE 2

MIN function rules for merging character strings

| Data type$_i$ | Data type$_{i+1}$ | MIN(Data type$_i$, Data type$_{i+1}$) |
|---|---|---|
| CHAR(x) | CHAR(y) or VARCHAR(y) or LONG VARCHAR or CLOB(y) | CHAR(z) where z = min(x, y) |
| VARCHAR(x) | VARCHAR(y) or LONG VARCHAR or CLOB(y) | VARCHAR(z) where z = min(x, y) |
| LONG VARCHAR | CLOB(y) | LONG VARCHAR where x > 32700, CLOB(x) where x <= 32700 |
| CLOB(x) | CLOB(y) | CLOB(z) where z = min(x, y) |

The following table depicts the rules of the MIN function for merging graphics strings.

TABLE 3

MIN function rules for merging graphic strings

| Data type$_i$ | Data type$_{i+1}$ | MIN(Data type$_i$, Data type$_{i+1}$) |
|---|---|---|
| GRAPHIC(x) | GRAPHIC(y) or VARGRAPHIC(y) or LONG VARGRAPHIC or DBCLOB(y) | GRAPHIC(z) where z = min(x, y) |
| VARGRAPHIC(x) | VARGRAPHIC(y) or LONG VARGRAPHIC or DBCLOB(y) | VARGRAPHIC(z) where z = min(x, y) |
| LONG VARGRAPHIC | DBCLOB(y) | LONG VARGRAPHIC where x > 32700, DBCLOB(x) where x <= 32700 |
| DBCLOB(x) | DBCLOB(y) | DBCLOB(z) where z = min(x, y) |

The following formula depicts the rules of the MIN function for merging BLOB types:

MIN(BLOB(x), BLOB(y))=BLOB(z) where z= min(x,y)

Date and time data types present yet another special case. For date and time data types:

MIN(DATE, TIMESTAMP)=DATE
MIN(TIME, TIMESTAMP)=TIME
TIME and DATE are not compatible.

When date and time data types and character strings are compatible, an implicit type transformation is supported between the date and time data types and the character string data types, as follows:

MIN(data type$_i$, data type$_{i+1}$)=data type$_i$

Unicode provide a unique number for every character, no matter what platform, program or language. In a unicode database, CHAR strings and GRAPHIC strings are compatible and implicit data type transformation is supported as follows:

MIN(data type$_i$, data type$_{i+1}$)=data type$_i$

Although the present inventive technique was described with respect to assigning data, the present inventive technique is not meant to be limited to assigning data. In another embodiment, the present inventive technique may also be used when passing data among levels. Alternately, the present inventive technique may be used when retrieving data from a repository.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended thereto.

What is claimed is:

1. A computer-implemented method of determining a target data type in an environment having a plurality of levels comprising a source level, zero or more intermediate levels and a target level, the zero or more intermediate levels being between the source level and the target level, comprising:
   generating a target data type representing the transformation of a data type of an associated datum as the datum passes from the source level through the zero or more intermediate levels to the target level.

2. The method of claim 1 wherein the environment further comprises an additional target level, and zero or more additional intermediate levels, the zero or more additional intermediate levels being between the source level and the additional target level,
   wherein said generating also generates an additional target data type representing the transformation of the data type of the associated datum as the datum passes from the source level through the zero or more additional intermediate levels to the additional target level.

3. The method of claim 2 further comprising:
   assigning the datum to the target level in accordance with the target data type; and
   assigning the datum to the additional target level in accordance with the additional target data type.

4. The method of claim 1 further comprising:
   assigning the datum to the target level in accordance with the target data type.

5. The method of claim 4 further comprising:
   passing the target data type with the associated datum via the zero or more intermediate levels to the target level.

6. The method of claim 1 wherein the datum has an initial data type of $t_0$ and each intermediate level i, if any, associates the datum with a data type $t_i$ where i=1 to n−1, n being associated with the target level, and the target level associates the datum with a data type $t_n$, $T_i$ being a transformation function that changes data type $t_{i-1}$ to data type $t_i$, wherein said generating generates the target data type such that the target data type comprises at least a subset of the transformation functions.

7. The method of claim 1 wherein the target data type comprises a sequence of nested transformation functions having an innermost transformation function and an outermost transformation function, wherein each level is associated with a transformation function, wherein the outermost transformation function of the sequence of nested transformation functions is associated with the target level and the innermost transformation function of the sequence of nested transformation functions is associated with the source level.

8. The method of claim 6 further comprising:
   merging at least one of the transformation functions with another one of the transformation functions.

* * * * *